United States Patent
Ebrahimi Afrouzi

(10) Patent No.: US 10,207,408 B1
(45) Date of Patent: Feb. 19, 2019

(54) METHOD TO MINIMIZE COLLISIONS OF MOBILE ROBOTIC DEVICES

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 95 days.

(21) Appl. No.: 15/286,911

(22) Filed: Oct. 6, 2016

Related U.S. Application Data

(60) Provisional application No. 62/264,194, filed on Dec. 7, 2015.

(51) Int. Cl.
*B25J 9/16* (2006.01)
*G05B 13/02* (2006.01)
*G06N 99/00* (2010.01)

(52) U.S. Cl.
CPC ........ *B25J 9/1676* (2013.01); *G05B 13/0265* (2013.01); *G06N 99/005* (2013.01); *G05B 2219/32334* (2013.01); *G05B 2219/40499* (2013.01); *Y10S 901/01* (2013.01)

(58) Field of Classification Search
CPC .............. B25J 9/1676; G05B 13/0265; G05B 2219/32334; G05B 2219/40499; G06N 99/005; Y10S 901/01
See application file for complete search history.

(56) References Cited

U.S. PATENT DOCUMENTS

| | | | |
|---|---|---|---|
| 6,678,582 B2 | 1/2004 | Waled | |
| 7,441,298 B2 | 10/2008 | Svendsen et al. | |
| 7,474,941 B2 | 1/2009 | Kim et al. | |
| 7,861,365 B2 | 1/2011 | Sun et al. | |
| 7,952,470 B2 | 5/2011 | Liao et al. | |
| 9,320,398 B2 | 4/2016 | Hussey et al. | |
| 2007/0017061 A1 | 1/2007 | Yan | |
| 2018/0079076 A1* | 3/2018 | Toda | B25J 9/1664 |

OTHER PUBLICATIONS

Macek, Kristijan, Ivan PetroviC, and N. Peric. "A reinforcement learning approach to obstacle avoidance of mobile robots." Advanced Motion Control, 2002. 7th International Workshop on. IEEE, 2002. (Year: 2002).*

Smart, William D., and L. Pack Kaelbling. "Effective reinforcement learning for mobile robots." Robotics and Automation, 2002. Proceedings. ICRA'02. IEEE International Conference on. vol. 4. IEEE, 2002. (Year: 2002).*

Argall, Brenna D., et al. "A survey of robot learning from demonstration." Robotics and autonomous systems 57.5 (2009): 469-483. (Year: 2009).*

* cited by examiner

*Primary Examiner* — Dale Moyer

(57) ABSTRACT

A method for minimizing the rate of collision of a mobile robotic device. A mobile robotic device selects controls comprised of sets of actions to navigate through a workspace. Controls resulting in non-collisions cause the system to earn a positive reward. Controls resulting in collisions cause the system to earn a negative reward. Cumulative rewards over the course of a work session are compared to the cumulative rewards of other work sessions. A policy is defined based on outcomes of prior work sessions to minimize the expected number of collisions.

7 Claims, 2 Drawing Sheets

METHOD TO MINIMIZE COLLISIONS OF MOBILE ROBOTIC DEVICES

FIELD OF INVENTION

The present invention relates to methods for improving navigation of mobile robotic devices. More particularly, the invention relates to reducing the rate of collisions with obstacles over time.

BACKGROUND

Robotic devices are used in a variety of applications for carrying out tasks autonomously. One problem robotic devices face is avoiding collisions while driving through an environment. Different types of sensors are commonly used to identify obstacles and avoid collisions. A robotic surface coverage device may drive through an area faster when fewer collisions are incurred, and thus a job of a robotic surface coverage device may be completed more efficiently. A need exists for a method to reduce the rate of collisions in mobile robotic devices.

SUMMARY

The present invention discloses a method for a robotic device to autonomously reduce its collision rate over time. A robotic device selects and carries out actions and is assigned positive or negative rewards based on the results of carrying out the various actions. Actions that result in collisions will incur negative rewards. Actions that don't result in collisions will incur positive rewards. Over time, after servicing an area a plurality of times using varied actions, the best method for servicing the area can be identified by comparing the total rewards earned during each work session. The robotic device can then develop a policy that attempts to maximize rewards at all times, so the robotic device chooses the actions with the least likelihood of incurring negative rewards (and thus the least likelihood of resulting in collisions).

DETAILED DESCRIPTION OF THE INVENTION

Figure 1:
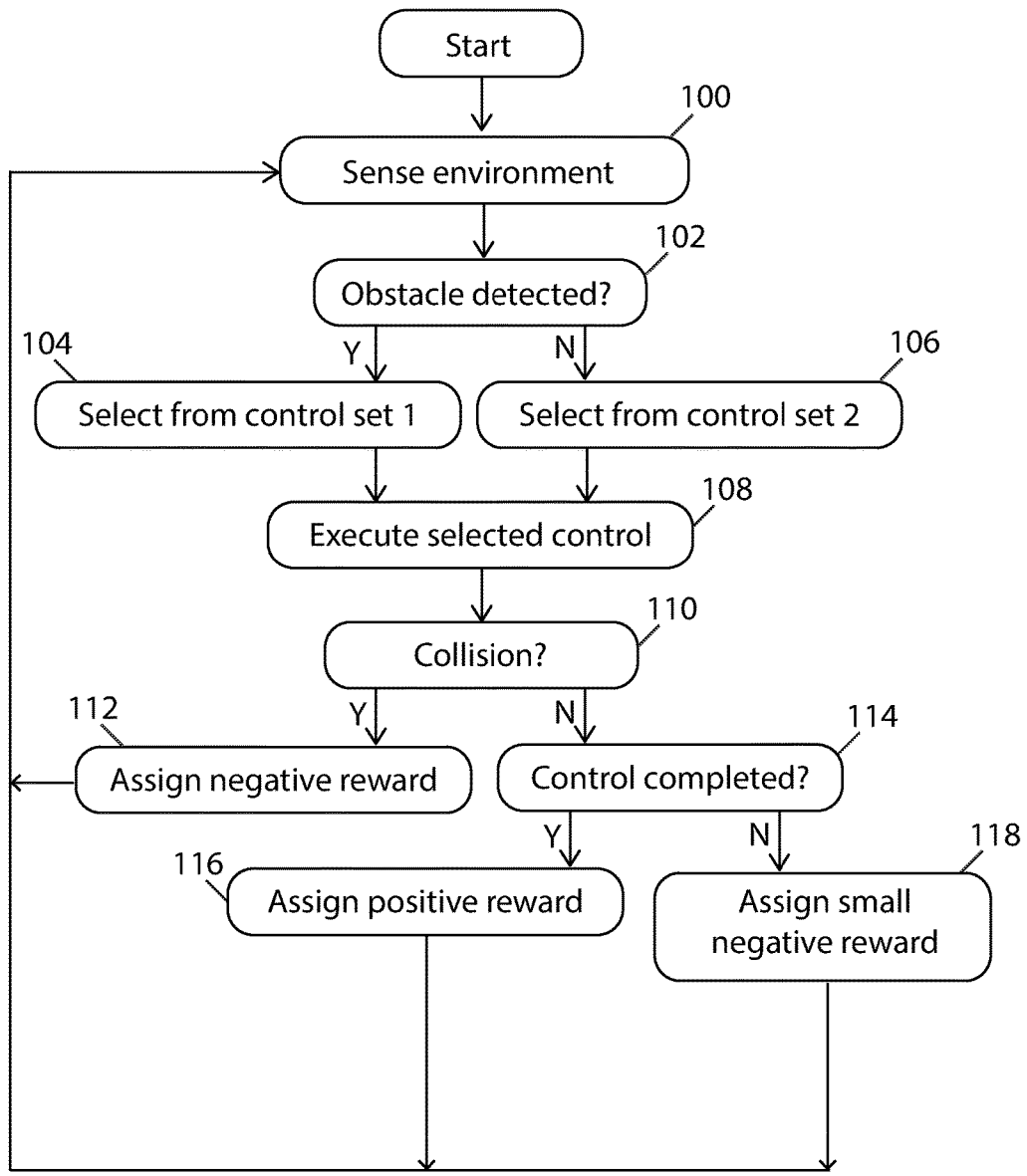
FIG. 1 illustrates the process of assigning rewards based on the outcome of a control embodying features of the present invention.

The present invention relates to a method for improving decision-making of a mobile robotic device over time so that collisions with obstacles may be reduced by defining a policy based on outcomes of prior actions. Briefly, a mobile robotic device may service a work area using a number of movements, herein referred to as controls. Controls result either in the device colliding with an obstacle or the device not colliding with an obstacle. Whenever a collision occurs, a negative reward is assigned to the system. Whenever a non-collision occurs following a control, a positive reward is assigned to the system. The system may be configured to try to maximize rewards by selecting controls with a lesser rate of producing collisions. Over time, the system may develop a policy to minimize collisions based on the total rewards earned during each work session.

A mobile robotic device is provided with a variety of controls from which it may select to navigate through its environment. A control may be comprised of an action or series of actions. Controls are selected, in part, based on input from sensors. For example, a robotic device that has received input from a leftmost obstacle sensor may be configured to only select from controls that do not begin with leftward or forward movement. However, controls may also be selected, in part, at random. A robotic device having received no input from sensors may select from controls without regard to the directionality of initial movements. After selecting a control, the control is executed. If, during execution of the control, the device collides with an obstacle as detected by one or more touch sensors, a negative reward is assigned to the system. If the control is interrupted before completion, for example, by a moving obstacle, but no collision occurs, a smaller negative reward is assigned to the system. If the control is completed without any collisions, a positive reward is assigned to the system. The robotic device repeats this process to select controls to move through its environment.

Execution of each control results in the transition from a first state to a next state. The reward (R) of each state (s) may be represented by:

$$R_{(s)} = R_{(ts)} \gamma^t$$

Where t is discrete time and γ is a discount factor.

The reward after the transition from state (s) to (S') may be represented by:

$$R_{(s')} = R_{(ts)} \gamma^t + R_{(ts+1)} \gamma^{t+1}$$

The cumulative rewards over the course of a work session are combined to determine the payoff of the arrangement of controls. The total reward for work in a session can be represented by:

$$R_{(t0)} \gamma^t + R_{(t1)} \gamma^t + R_{(t2)} \gamma^t + R_{(t3)} \gamma^t + \ldots + R_{(tn)} \gamma^t = \text{Total reward}$$

The system may be configured to attempt to maximize this value at all times, which is represented by the formula:

$$E\left[\sum \gamma^t R_t\right] \to \text{Max}$$

Where E is the expectation that R (reward) is maximized.

Therefore, the value of state (s) when policy (π) is executed equals the expected sum of all future discounted rewards provided that the initial state ($s_0$) is (s) and policy (π) is executed as represented by the formula:

$$\overset{\pi}{V}_{(s)} = E_{\pi_t}\left[\sum \gamma^t R_t \,\middle|\, s_0 = s\right]$$

From the above, a value iteration may be concluded:

$$V_{(s)} = \left[\max_{a_{s'}} \gamma \sum P(s \mid s, a) V_{(s')}\right] + R_{(s)}$$

Where:
$\max_a$ = maximizing action
$V_{(s')}$ = value of successor
$R_{(s)}$ = reward or cost to get to state s P=state transition function
R=reward function The above formula is found after convergence according to Bellman's equation represented by the formula:

$$\max \sum_{t=0}^{\infty} \beta^t \mu(c_t) \text{ subject to}$$

$$a_{t+1} = (1+r)(a_t - c_t), c_t \geq 0, \text{ and}$$

$$\lim_{t \to \infty} a_t \geq 0, \text{ and}$$

$$V(a) = \max\{\mu(c) + \beta V((1+r)(a-c))\}$$

The value of a given state depends on the outcome of the prior state multiplied by the cost (penalty incurred) to get there. The system can then compare the values of the controls used in each session and determine which set of controls has the highest value. As the system completes more sessions, more and more data is gathered and values are assigned to each state. That is, a value is assigned to each set of controls used. Once values have been assigned to sets of controls, the system can calculate a policy to maximize rewards. The system develops a policy that defines the best set of controls yet discovered. This is represented by the formula, $$\pi(s) = \underset{s'}{\operatorname{argmax}} \sum P(s' \mid s_1 a) V(s')$$

From the value iteration, the system may find policy 1, which is a better policy than policy 0 and then find a policy 2, which is a better than policy 1 and so on. The above formula therefore finds the best eventual policy.

$Pa(s,s')=Pr(st+1=s'|st=s,at=a)$ is the probability that action a in state s at time t will lead to state s' at time t+1

And $R_a(s,s')$ is the immediate reward received after transition to state s' from s And $\gamma \in [0,1]$ is the discount factor.

A desirable outcome is to choose a policy ($\pi$) that will maximize the expected discounted sum of the rewards collected at any given state (s). The system uses the policy ($\pi$) to move through the environment in the best known manner.

In this method, S (state) refers to the state of the device after each control. A finite number of controls are possible, and thus there are a finite number of resulting states. A is the action or control selected, which takes the device from state S to state S'.

Referring to FIG. 1, the process of assigning rewards based on the outcome of a control is illustrated. In a first step 100, the system senses the environment through one or more sensors. In a next step 102 the system determines whether an obstacle has been detected. If an obstacle has been detected, the system proceeds to a next step 104 to select a control from a first set of controls. If an obstacle is not detected in step 102, the system proceeds to a next step 106 to select a control from a second set of controls. Then the system proceeds to a step 108 to execute the selected control. In a next step 110, the system determines whether a collision occurred. If a collision occurred, the system proceeds to a next step 112 to assign a negative reward to the system. If a collision did not occur, the system proceeds to a next step 114 to determine if the control was completed. If the control was completed, the system proceeds to a next step 116 to assign a positive reward to the system. If the control was not completed, the system proceeds to a next step 118 to assign a small negative reward to the system. The system proceeds by restarting the cycle beginning from step 100.

Figure 2:
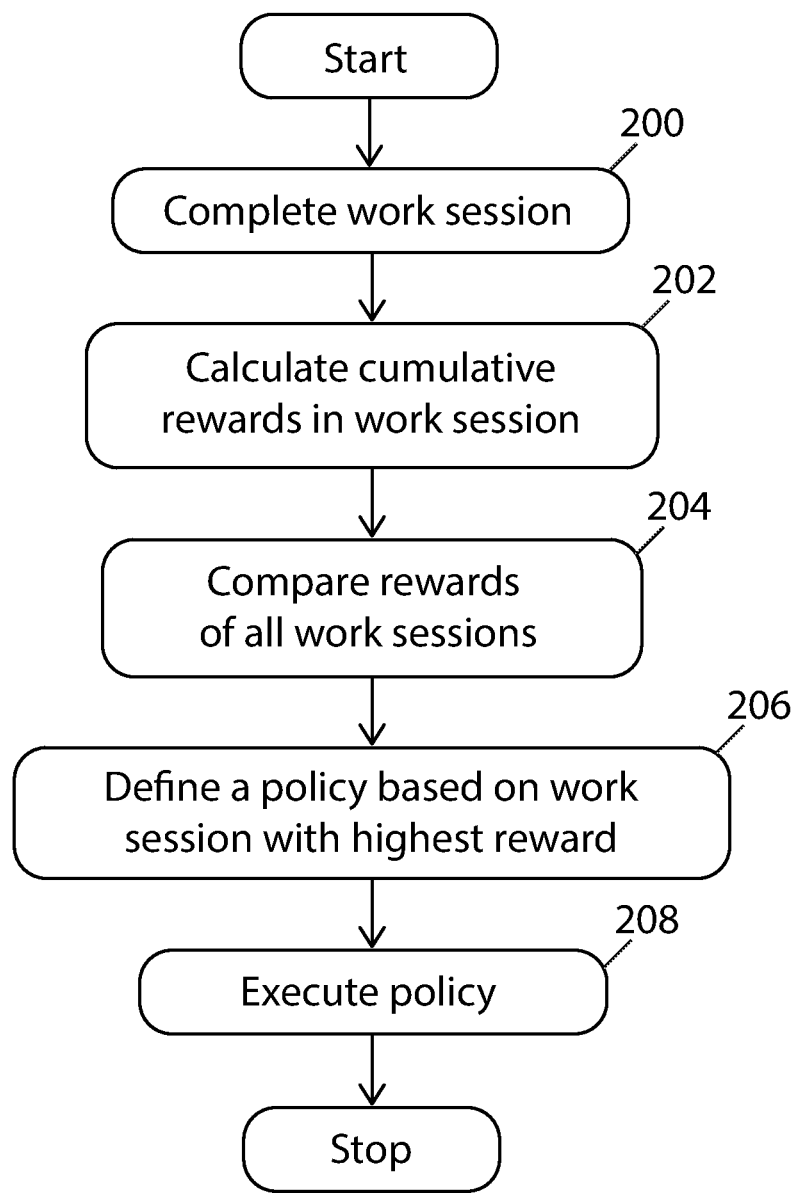
FIG. 2 illustrates the process of defining a policy to maximize rewards embodying features of the present invention.

Referring to FIG. 2, the process of defining a policy to maximize rewards is illustrated. The process begins when a mobile robotic device has completed a work session in a first step 200. The system then proceeds to a next step 202 to calculate the cumulative rewards earned in the completed work session. The system then proceeds to a next step 204 to compare the cumulative rewards of all work sessions. The system then proceeds to a next step 206 to define a policy based on the work session with the greatest cumulative rewards. The system then proceeds to a next step 208 to execute the defined policy.

I claim:

1. A method for minimizing the rate of collisions incurred by a mobile robotic device comprising:
   selecting controls comprised of sets of actions to navigate through a workspace;
   carrying out the selected controls by a mobile robotic device;
   detecting whether a collision has been incurred by the mobile robotic device; and
   calculating and assigning varying levels of rewards to the mobile robotic device system based on the type of obstacle encountered and the success or failure of controls in avoiding collisions and carrying out controls.

2. The method of claim 1, further comprising:
   determining a value of a work session based on the value of rewards earned during the work session; and
   iteratively creating policies for navigation to maximize rewards earned during each work session, thereby minimizing collisions.

3. The method of claim 1, wherein assigned rewards are decreased over time within a work session by a decay factor to account for a long term reduction in run time due to deterioration of battery life over time.

4. The method of claim 1, wherein controls are selected, in part, based on input from one or more sensors.

5. A method for minimizing the rate of collisions incurred by a mobile robotic device comprising:
   selecting controls comprised of sets of actions to navigate through a workspace;
   carrying out the selected controls by a mobile robotic device;
   detecting whether a collision has been incurred by the mobile robotic device; and
   calculating and assigning rewards to a mobile robotic device system based on the success or failure of controls in avoiding collisions and carrying out controls;
   wherein assigned rewards are decreased over time within a work session by a decay factor to account for a long term reduction in run time due to deterioration of battery life over time.

6. The method of claim 5, further comprising:
   determining a value of a work session based on the value of rewards earned during the work session; and
   iteratively creating policies for navigation to maximize rewards earned during each work session, thereby minimizing collisions.

7. The method of claim 5, wherein controls are selected, in part, based on input from one or more sensors.

* * * * *